(12) United States Patent
Pratapa et al.

(10) Patent No.: US 9,148,402 B2
(45) Date of Patent: Sep. 29, 2015

(54) SYSTEMS, METHODS, AND APPARATUS FOR FULL-CONE AND ADDRESS RESTRICTED CONE NETWORK ADDRESS TRANSLATION USING HARDWARE ACCELERATION

(71) Applicant: Qualcomm Innovation Center, Inc., San Diego, CA (US)

(72) Inventors: Chaitanya Pratapa, Hyderabad (IN); Rohit Tripathi, San Diego, CA (US); Poonam Mishra, Hyderabad (IN)

(73) Assignee: Qualcomm Innovation Center, Inc., San Diego, CA (US)

( * ) Notice: Subject to any disclaimer, the term of this patent is extended or adjusted under 35 U.S.C. 154(b) by 189 days.

(21) Appl. No.: 14/099,334

(22) Filed: Dec. 6, 2013

(65) Prior Publication Data

US 2015/0163197 A1 Jun. 11, 2015

(51) Int. Cl.
*G06F 15/16* (2006.01)
*H04L 29/12* (2006.01)
*G06F 9/46* (2006.01)

(52) U.S. Cl.
CPC .............. *H04L 61/2514* (2013.01); *G06F 9/46* (2013.01); *H04L 61/255* (2013.01); *H04L 61/2517* (2013.01)

(58) Field of Classification Search
CPC ... H04L 29/12; H04L 61/2575; H04L 61/255; H04L 61/2517
USPC ........................... 709/223, 230, 245; 370/252
See application file for complete search history.

(56) References Cited

U.S. PATENT DOCUMENTS

| 8,422,391 | B2 * | 4/2013 | Zhu ................................ 370/252 |
| 2004/0073704 | A1 * | 4/2004 | Paunikar et al. .............. 709/245 |
| 2007/0078986 | A1 * | 4/2007 | Ethier et al. .................. 709/227 |
| 2015/0215275 | * | 7/2015 | Paunikar et al. .............. 709/245 |

\* cited by examiner

*Primary Examiner* — Frantz Jean
(74) *Attorney, Agent, or Firm* — Neugeboren O'Dowd PC (57) ABSTRACT

This disclosure describes systems, methods, and apparatus for using a NATTYPE module in a Linux kernel to carry out Full Cone NAT and address-restricted cone NAT while offloading NAT functionality to a hardware accelerator. The NATTYPE module can be configured to create a mapping between conntrack entries and NATTYPE entries and a conntrack module can be configured to update a NATTYPE entry when a conntrack entry is updated and the conntrack entry includes a mapping to a NATTYPE entry. Alternatively, a hardware accelerator controller can be configured to refresh conntrack entries as well as NATTYPE entries.

18 Claims, 5 Drawing Sheets

SYSTEMS, METHODS, AND APPARATUS FOR FULL-CONE AND ADDRESS RESTRICTED CONE NETWORK ADDRESS TRANSLATION USING HARDWARE ACCELERATION

BACKGROUND

1. Field

The present disclosure relates generally to NAT, and more specifically to Full Cone NAT and address-restricted cone NAT performed on a Linux system.

2. Background

When IP addressing was originally created, the small size of the Internet at the time, led people to believe that the number of IP addresses would be more than enough to handle any need. As networks of home and business computers and other devices exploded, this view began to change. Realizing that there were not enough IP addresses to sustain this growth, network address translation, or NAT, was developed as a network protocol enabling a router or other routing device (a "NAT device") to act as a translator (think of a telephone switchboard operator) between multiple devices on a private network and devices on the public Internet, and in this way enable multiple devices on a private network to share a single, and increasingly scarce, public IP address.

In particular, a NAT device changes or translates a source IP address in a header of outgoing packets from devices in the private network so that the packets appear to be coming from the NAT device. In other words, the source IP address of outgoing packets is changed or translated from the private IP address of the originating device to the public IP address of the NAT device. The NAT device also creates a mapping of this translation so that it can guide incoming (responding) traffic to the correct device on the private network. Responding devices on the public Internet believe that they are receiving packets from the NAT device, and therefore respond by sending packets to the NAT's public IP address. The NAT device then uses the stored mapping to determine which device on the private network to forward incoming traffic to, and further changes a destination IP address in a header of incoming packets to that of the device on the private network that the packets are being forwarded to. In this way, both sending and receiving devices are unaware of the NAT's existence in the communication path.

While NAT was originally designed to enable multiple devices on a private network to share a single public IP address, more recent applications have included firewall-type purposes such as the masking of private IP addresses and filtering of incoming traffic.

Such applications are carried out via four different types of NAT: Full Cone; address restricted cone; port restricted cone; and symmetric. Systems using a LINUX kernel can perform port-restricted cone and symmetric NAT as these are supported by the LINUX kernel. However, the LINUX kernel does not support Full Cone and address restricted cone NAT. One workaround is use of the "NATTYPE module", which can be run within the LINUX kernel. The NATTYPE module adds functions to the default Linux kernel functions that further enable the Linux kernel to perform Full Cone and address restricted cone NAT translation.

While this workaround is typically effective, problems arise when used in combination with a hardware accelerator. Hardware accelerators are hardware components (e.g., integrated circuits) that are used to increase performance of computing operations where specially designed hardware can more quickly or more efficiently perform processes than a similar software component running on a general-purpose CPU. Firewall and NAT operations in software consume a large portion of processing resources (e.g., million instructions per second or MIPS) and thus to enable high data throughput, it is desirable to distribute some or all firewall and NAT operations to a hardware accelerator. This enables software components such as the kernel to perform other processing duties in parallel with the firewall and NAT operations. The problem with using hardware acceleration in the NAT context, is that if Full Cone and address restricted cone NAT are desired, and therefore the NATTYPE module is used to overcome the kernel's default inability to perform these types of NAT's, then use of hardware acceleration causes entries created by the NATTYPE module to time out. This results in dropping of packets from known connections.

In particular, the LINUX kernel typically maps private to public IP addresses and ports for incoming and outgoing packets (depending on the NAT type). These mappings are stored in conntrack entries of kernel memory. These entries include timeout values that decrement unless periodically refreshed. Once a conntrack entry is created for a new connection, subsequent packets pass through the hardware accelerator rather than the kernel, and thus the timeout values in the conntrack entries in the kernel decrement. A userspace controller of the hardware accelerator monitors packet translation in the hardware accelerator and periodically updates the conntrack entries in the kernel based on this monitoring.

Similarly, when the NATTYPE module is invoked, the kernel creates conntrack entries and NATTYPE entries for new connections, and both types of entries have timeout values that need to be periodically refreshed. Again, subsequent packets from a known connection pass solely through the hardware accelerator. The libnetfilter_conntrack is a userspace library which provides an interface to alter the conntrack entries through netlink sockets. The libnetfilter_conntrack includes a mechanism to update/alter conntrack entries but does not include a mechanism for updating/altering the NATTYPE entries. The hardware accelerator controller refreshes the conntrack entries, using this mechanism, but since it is unable to update the NATTYPE entries, they eventually timeout. When they timeout, subsequent incoming packets are no longer recognized as coming from a known external source and are thus dropped.

SUMMARY

Embodiments disclosed herein address the above stated needs by providing systems, methods, and apparatus that modify a conntrack module and NATTYPE module of a kernel such that mappings are created between conntrack entries and NATTYPE entries that can be used to coordinate refreshing of the NATTYPE entries when conntrack entries are refreshed.

One aspect of the disclosure is a NAT device including an internal network interface, an external network interface, a hardware accelerator, and a processor. The internal network interface can have an internal IP address and an internal port number. The external network interface can have a public IP address and a public port number. The hardware accelerator can have a non-transitory, tangible computer readable storage medium, encoded with processor readable instructions to perform a first method. The first method can include determining that a first packet is being transmitted on an unknown connection, and passing the first packet to a kernel of the NAT device. The processor can include the kernel, a conntrack module a NATTYPE module, and a non-transitory, tangible computer readable storage medium, encoded with processor readable instructions to perform a second method. The second method creates conntrack entries and NATTYPE entries in a kernel memory of the processor. The second method can include replacing the frist packet's source IP address and source port number with the public IP address and public port number of the external network interface. The second method can also include storing the mapping of the replacing as part of a NATTYPE entry in the NATTYPE module. The second method can further include storing the mapping of the replacing in a memory of the hardware accelerator. The second method can further include storing a mapping between the conntrack entry and the NATTYPE entry in the conntrack entry. The second method can yet further include transmitting the first packet to a destination IP address and a destination port.

Another aspect of the disclosure is a method for preventing unintended packet filtering in Full Cone NAT and Address Restricted Cone NAT using hardware acceleration. The method can include receiving, from a device behind a NAT, a first packet at a hardware accelerator of the NAT performing Full Cone NAT or Address Restricted Cone NAT. The first packet can be destined for a device external to the NAT. The method can also include determining, via the hardware accelerator, that the first packet is not associated with a known connection. The method can further include passing the first packet from the hardware accelerator to a kernel of the NAT. The method can yet further include creating a NAT mapping of a translation of the first packet's source socket address from a private to a public socket address. The method can also include translating, via the kernel, the first packet's source socket address from the private to the public socket address based on the NAT mapping. The method additionally can include storing the NAT mapping in a conntrack entry of kernel memory. Yet further, the method can include storing the NAT mapping in a NATTYPE entry of the kernel memory. The method can also include storing the NAT mapping in a memory of the hardware accelerator. The method can yet further include creating, via the kernel, an internal kernel mapping between the conntrack entry and the NATTYPE entry. Additionally, the method can include storing the internal kernel mapping in the conntrack entry of the kernel memory.

Yet another aspect of the disclosure involves a non-transitory, tangible computer readable storage medium, encoded with processor readable instructions to perform a method for preventing unintended packet filtering in Full Cone NAT and Address Restricted Cone NAT using hardware acceleration. The method can include receiving, from a device behind a NAT, a first packet at a hardware accelerator of the NAT performing Full Cone NAT or Address Restricted Cone NAT. The first packet can be destined for a device external to the NAT. The method can also include determining, via the hardware accelerator, that the first packet is not associated with a known connection. The method can further include passing the first packet from the hardware accelerator to a kernel of the NAT. The method can yet further include creating a NAT mapping of a translation of the first packet's source socket address from a private to a public socket address. The method can also include translating, via the kernel, the first packet's source socket address from the private to the public socket address based on the NAT mapping. The method additionally can include storing the NAT mapping in a conntrack entry of kernel memory. Yet further, the method can include storing the NAT mapping in a NATTYPE entry of the kernel memory. The method can also include storing the NAT mapping in a memory of the hardware accelerator. The method can yet further include creating, via the kernel, an internal kernel mapping between the conntrack entry and the NATTYPE entry. Additionally, the method can include storing the internal kernel mapping in the conntrack entry of the kernel memory.

DETAILED DESCRIPTION

The word "exemplary" is used herein to mean "serving as an example, instance, or illustration." Any embodiment described herein as "exemplary" is not necessarily to be construed as preferred or advantageous over other embodiments.

For the purposes of this disclosure, a conntrack entry and a NATTYPE entry each record at least three sockets: a source socket, a destination socket, and a public socket. For outgoing packets, the source socket is an internal or private socket while the destination socket is the socket for the device receiving the packet. The public socket is the public IP address and port of the NAT device through which the packet is being translated. For incoming packets, the source socket is a socket of the device sending the packet to the public socket of the NAT (which was the destination socket for the outgoing packet), the destination socket is the internal or private socket of the receiving device behind the NAT, and the public socket is again the external or public socket of the NAT. Each socket includes two values: an IP address and a port number. Thus, each conntrack entry and NATTYPE entry includes six values: three IP addresses and three port numbers.

For the purposes of this disclosure, a packet includes a header with a source socket and a destination socket.

There is a need in the art for mechanisms enabling use of the NATTYPE module with hardware acceleration and where the NATTYPE entries do not time out. This disclosure describes two approaches to the problem of preventing NATTYPE entry timeout. The first creates a mapping between conntrack and NATTYPE entries in the kernel when both entries are created (i.e., when a packet from an uknown connection is first seen). When the conntrack entries are refreshed, a conntrack module (e.g., conntrack netlink module) looks for such a mapping between the conntrack entry being refreshed and a corresponding NATTYPE entry. If one exists, then the conntrack module also updates the timeout of the corresponding NATTYPE entry. In the second approach, when a hardware accelerator controller updates conntrack entries, a second netlink message is passed to the kernel to also update the corresponding NATTYPE entries. This requires changes in the libnetfilter_conntrack userspace library to provide a mechanism to send netlink messages to the conntrack module to update the timeout of NATTYPE entry, in addition to the traditional role of refreshing the conntrack entries. This also requires changes to the NATTYPE module to provide a mechanism to update the NATTYPE entry timeout using the conntrack netlink sockets. For the purposes of this disclosure, a conntrack netlink module handles netlink messages from userspace.

Before going further it is instructive to discuss the underlying NAT operations in a Linux system. NAT involves two main functions: connection tracking (e.g., conntracking) and packet filtering. Connection tracking involves creating a mapping between a client and server socket (comprising an IP address and port) and then updating or refreshing the mapping as traffic on the connection ensues. Packet filtering uses rules to determine what to do with packets that meet certain conditions. Rules look for a match, such as a known socket, and then carry out some action (or "target") on packets. Some exemplary targets include DROP (drop or filter the packet) and NAT (perform socket translation on packets traversing a NAT device).

Linux performs NAT as one of the functions of a packet filter framework called Netfilter. This framework enables a Linux machine with an appropriate number of network interfaces to become a router capable of NAT. The particular mechanisms used to carry out NAT in the Netfilter framework are the conntrack module and iptables. The conntrack module performs connection tracking or the tracking of connections and iptables enables creation and modification of packet filtering rules in the kernel. The conntrack module stores a record of connections as conntrack entries that include information describing a connection such as client and server IP address, client and server port numbers, and timeout or time to live values for the connection. The timeout is set whenever a conntrack entry is created and decrements with time until either further packet traffic causes a refresh of the timeout or the timeout value decrements to zero and the conntrack entry is no longer considered valid (i.e., any further packets). The rules that are stored in tables and chains of the iptables module look for known connections, or matches, in the conntrack entries and then invoke a target (carry out an action) on the matches. For instance, a rule in iptables may look for outgoing packets having an IP address 112.112.112.112 and port 80. When a packet passes through the NAT device from this socket, the rule may invoke a target NAT that performs translation of the socket to a public IP address and port.

Rules include tables, such as a 'nat' table, and each table includes one or more chains. For instance, the nat table includes three predefined chains: PREROUTING, OUTPUT, and POSTROUTING. The chains PREROUTING and POSTROUTING are the most important ones. As the name implies, the PREROUTING chain is responsible for packets that just arrived at the network interface. So far no routing decision has taken place, therefore it is not yet known whether the packet would be interpreted locally or whether it would be forwarded to another machine located at another network interface. After the packet has passed the PREROUTING chain a routing decision is made. In case the local machine is the recipient, the packet will be directed to the corresponding process NAT is no longer part of the process. If the recipient is located in a subnet located at a different network interface, the packet will be forwarded to that interface, provided that the machine is configured to do so. Just before a forwarded packet leaves the machine it passes the POSTROUTING chain and then leaves through the network interface. For locally generated packets there is a small difference: instead of passing the PREROUTING chain locally generated packets pass through the OUTPUT chain and then move on to the POSTROUTING chain.

Iptables includes rules for port restricted cone NAT and symmetric NAT. The rule for port restricted cone NAT is:

iptables -t nat -A POSTROUTING -o <interface> -j SNAT -to-source <public ip>

The "iptables" component invokes the command line utility for configuring the kernel. "-t nat" is a command to select the table "nat" for configuration of NAT rules. Iptables includes three tables, filter, mangle, and NAT, and filter is the default. Thus, this rule selects the nat table since otherwise the rule would be added to the filter table. The "-A POSTROUTING" command appends a rule to the POSTROUTING chain, and "-A" stands for "append." The "-o <interface>" command dictates that this rule is valid for packets that leave on whatever interface is inserted in <interface> (e.g., "eth1"). The "-o" dictates that the rule applies to outgoing packets. The "-j SNAT" target (or action) dictates that the rule performs source NAT on packets and thus translates or changes the sender IP address to the public IP address specified by the value "<public ip>."

The rule for symmetric NAT is:

iptables -t nat -A POSTROUTING -o <interface> -j MASQUERADE -random

This rule is nearly identical to the port restricted cone NAT rule except that here the target is "MASQUERADE," which performs the action of masquerading packets (translating or changing the sender's socket address with the NAT device's public socket address). Furthermore, MASQUERADE creates a conntrack entry that records the translation or masquerading of each packet.

As seen, iptables enables port restricted cone and symmetric NAT, but does not provide any mechanisms to carry out address-restricted cone (ARC) NAT or Full Cone NAT. To remedy this limitation, a module called the NATTYPE module can be added to the kernel which provides mechanisms for carrying out these types of NAT. In particular, the NATTYPE module provides a NATTYPE target that can be used with the iptables command to carry out Full Cone and ARC NATFull Cone. For instance, Full Cone NAT can be carried out via adding the following rules to iptables:

iptables -t nat -A POSTROUTING -o <public interface> -j MASQUERADE -random iptables -t nat -A PREROUTING -i <public interface> -j NATTYPE -mode dnat -type 1 iptables -A FORWARD -o <public interface> -j NATTYPE -mode forward_out -type 1 iptables -A FORWARD -i <public interface> -j NATTYPE -mode forward_in -type 1

ARC NAT can be carried out via adding the following rules to iptables:

iptables -t nat -A POSTROUTING -o <public interface> -j MASQUERADE -random iptables -t nat -A PREROUTING -i <public interface> -j NATTYPE -mode dnat -type 2 iptables -A FORWARD -o <public interface> -j NATTYPE -mode forward_out -type 2 iptables -A FORWARD -i <public interface> -j NATTYPE -mode forward_in -type 2

When a first packet on a connection is transmitted from behind a NAT device, the first rule above (in each of the above sets of four rules) is invoked as the packet passes through the POSTROUTING chain. The first rule performs the MASQUERADE target, thereby translating the source socket address in the header of the outgoing packet (from an internal or private socket to an external or public address) and storing a mapping of this translation in a conntrack entry in the conntrack module. The MASQUERADE target further stores a destination socket address in the conntrack entry, where the destination socket is that of the device outside of the NAT to which the packet is destined. The outgoing packet also sees the FORWARD chain and thus the forward_out mode of the NATTYPE target. This target creates a NATTYPE entry for the packet (having similar values to those in the conntrack entry). In other words, the first and third rules create the conntrack entry and the NATTYPE entry, respectively, when a first packet in a connection is transmitted.

Typically incoming packets will be dropped unless they are part of a known connection. This means, they have a destination socket of the public or external socket address of the NAT device, (for Full Cone NAT and ARC NAT). Additionally, in the case of ARC NAT, incoming packets must also be sent from an external device that has previously received at least one packet from a device behind the NAT, or they are dropped. This packet filtering is carried out via the dnat mode of the NATTYPE target as follows. Before the incoming packets are translated by the kernel, they pass through the PREROUTING chain. They thus see the NATTYPE target invoked, and in particular the dnat mode. The dnat mode determines if an incoming packet should be dropped by determining if the incoming packet has a destination socket address that matches an external socket address of the NAT device by checking if the packet's destination socket address matches a public socket address of a NATTYPE entry. If such a match occurs, then the packet is allowed, and otherwise is dropped. For ARC NAT, the dnat mode also checks to see if an existing NATTYPE entry includes a destination socket address that matches the source address of the incoming packet, thus determining if the packet is incoming from a device that previously received a packet from a device behind the NAT device. If so, then the packet is allowed.

For allowed packets, the dnat mode creates a new conntrack entry for the incoming packets, including a source socket address (the socket address of the device sending the incoming packet to the NAT device), a destination socket address (the private socket address of the device behind the NAT device), and a public socket address (the public socket of the NAT device).

On subsequent packet transmissions, existing conntrack entries are merely refreshed if the source and destination are in an existing conntrack entry. Only where a new source or destination is involved, is a new conntrack entry created.

Once packets pass through the PREROUTING chain they are translated by the kernel (i.e., by the conntrack module). In other words, the destination socket address in the packet header is changed from the public socket of the NAT to the private socket of the device behind the NAT. A routing decision is then made. If the packet is destined for the internal LAN interface, then the packet is forwarded to the internal LAN interface through the FORWARD chain, and therefore sees the forward_in mode of the NATTYPE target. The forward_in mode refreshes the original NATTYPE entry for both Full Cone and ARC NAT.

Subsequent outgoing packets from the internal socket address will see the MASQUERADE target update the original conntrack entry and the NATTYPE -mode forward_out target will refresh the NATTYPE entry. Subsequent incoming packets on known connections will see the NATTYPE-mode dnat target update the new conntrack entry and the NATTYPE -mode forward_in will update the NATTYPE entry.

It should be understood that in the above rules for Full Cone and ARC NAT, the -type 1 and -type 2 indicators are arguments to the NATTYPE target that indicate whether the target performs functions of Full Cone NAT (-type 1) or functions of ARC NAT (-type 2).

One of skill in the art will recognize that the above rules can have variations that do not change the key aspects of the disclosure. For instance, the rules can further include commands related to matching, such as the connection type (e.g., TCP or UDP, to name two) and a match IP address or match port (e.g., eth0 or eth 1, to name two). Also, the order of commands following "iptables" can vary and the above examples in no way limit the order in which commands can be presented.

Complications arise when the translation of packets and carrying out of the above rules for Full Cone and ARC NAT is carried out via hardware acceleration. In that case, incoming and outgoing packets arrive at a hardware accelerator that has its own values for the sockets recorded in the conntrack entries. In other words, the hardware accelerator has its own NAT mappings for known connections in a memory of the hardware accelerator. These NAT mappings are created in the hardware accelerator memory via a hardware accelerator controller that monitors the creation of conntrack entries in the kernel and creates corresponding NAT mappings in the hardware accelerator memory. In this way, when incoming or outgoing packets are part of a known connection, the source and destination socket addresses match the source and destination socket addresses in a NAT mapping of the hardware accelerator, the hardware accelerator can translate and forward the packets without involving the kernel (in other words, enabling NAT to bypass software of the Linux machine).

More particularly, if an incoming or outgoing packet matches an existing NAT mapping of the hardware accelerator, then the packet can be processed by rules in the hardware accelerator as follows: the packet header can be translated (e.g., the source socket can be translated from the private to public socket for outgoing packets and the destination socket can be translated from the public to private socket for incoming packets) and the packet can be forwarded according to the destination socket address in the packet's header.

If a match does not exist (e.g., if the connection is not known), then the packet is passed to the kernel to create a new conntrack entry or the packet is dropped. For instance, for outgoing packets having a source and destination socket that match a NAT mapping in the hardware accelerator, the packet can be translated by the hardware accelerator and passed to the destination socket. For outgoing packets having a destination socket that does not exist in the NAT mapping of the hardware accelerator, the packet can be passed to the conntrack module of the kernel in order to create a new conntrack entry. Similarly, for incoming packets having a destination socket that matches a NAT mapping in the hardware accelerator, but a source socket that does not match an existing NAT mapping, the hardware accelerator passes the packet to the conntrack module of the kernel so that a new conntrack entry can be created. For incoming packets having a source and destination socket that matches a NAT mapping in the hardware accelerator, the hardware accelerator can translate and forward the packet thus bypassing the kernel.

Because subsequent packets on a known connection are processed by the hardware accelerator and bypass the kernel, the conntrack entries in the kernel will eventually timeout. To avoid this, the hardware accelerator controller monitors packets processed by the hardware accelerator and periodically refreshes the conntrack entries in the kernel based on those packets passing solely through the hardware accelerator. This mechanism can be provided by the libnetfilter-conntrack library.

Everything works smoothly when symmetric and port-restricted cone NAT are carried out (e.g., when the SNAT and MASQUERADE targets are invoked). However, for Full Cone and ARC NAT, the NATTYPE target is invoked, and thus when conntrack entries are created for new connections, NATTYPE entries are also created in the kernel. The problem is that the libnetfilter-conntrack library does not have a mechanism for updating NATTYPE entries. Thus, while it is able to refresh conntrack entries when packets pass through the hardware accelerator, the corresponding NATTYPE entries are not updated and they eventually timeout.

To overcome this challenge, this disclosure provides the following solutions. The NATTYPE target can be modified so as to include a further action of creating a mapping between conntrack entries and NATTYPE entries and storing this mapping in conntrack entries when the conntrack entries are created. In other words, this disclosure describes a NATTYPE target that both performs NATTYPE entry creation and creation of a mapping between conntrack and NATTYPE entries. Further, the conntrack module can be modified to look for such a mapping when the hardware accelerator controller performs a refresh of a conntrack entry, and to then refresh a corresponding NATTYPE entry based on the mapping. More particularly, the forward_out and dnat modes of the NATTYPE target can be modified such that they not only create a NATTYPE entry for each new connection, but also create a mapping between corresponding conntrack entries and each new NATTYPE entry.

In an embodiment, changes can be made to the NATTYPE module so that a cookie is associated with each NATTYPE entry when created. Then, when the conntrack module goes to update a NATTYPE entry, the conntrack module first checks the cookie, and if a match exists, then the conntrack module completes the refresh of the NATTYPE entry. If there is no cookie or if the cookie, then the conntrack module ignores the refresh request.

Another way to overcome this challenge, is for the hardware accelerator controller to be reconfigured to update both the conntrack entries and the NATTYPE entries. This can entail changes in the libnetfilter_conntrack userspace library to provide a mechanism to send netlink messages to the conntrack module to update the timeout of NATTYPE entries in addition to its traditional role of updating conntrack entry timeouts. This embodiment further entails changes to the NATTYPE module enabling it to provide a mechanism to update the NATTYPE entry timeout using the conntrack netlink sockets.

Figure 1:
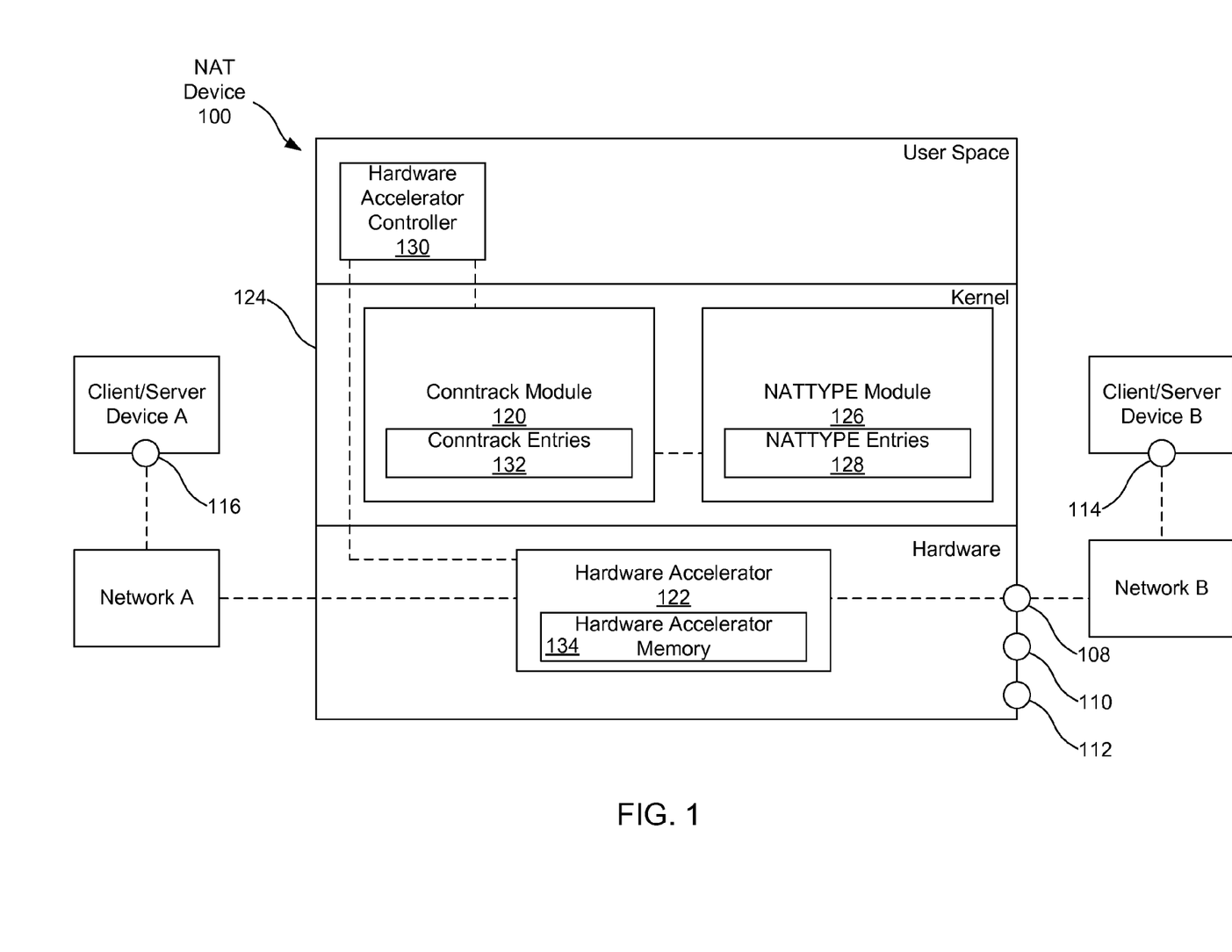
FIG. 1 illustrates a system for carrying out the NAT described herein.

FIG. 1 illustrates a system for carrying out the NAT described herein. The NAT device 100 can include any computing device able to perform NAT. Typically such a device includes one or more external ports 108, 110, 112. Packets from device A (either a client or a server) pass through a network A to NAT device 100. These packets can be destined for device B and thus have a destination socket matching socket 114. In particular, the destination socket address of the outgoing packets can include the IP address of device B, with a port number of port 114 on device B. These packets can further have a source socket address corresponding to device A's IP address and a port number of port 116 on device A. The NAT device 100 can translate these packets such that the source socket address appears to device B to be the socket address of the NAT device 100, thus preventing device B from having direct access to and knowledge of device A's socket address. In other words, when the packets leave the NAT device 100 via network B, their source address is that of the NAT device's 100 IP address and a port number of the first external port 108. If device B replies to packets from device A, then it addresses them to the IP address of the NAT device 100 and the first port 108 number. The NAT device 100 then translates the destination socket addresses of these incoming packets such that they appear to device A to have come directly from device B. In other words the NAT device changes or translates the destination IP address and destination port of the incoming packets to the destination socket for device A.

Symmetric and port-restricted NAT can be performed via a netfilter framework that includes a conntrack module 120. Some operations of these types of NAT can be offloaded to a hardware accelerator 122 to free up software resources in a kernel 124. In particular, the hardware accelerator 122 can receive outgoing packets from Device A and determine if each packet is part of a known connection. This can be accomplished by comparing the source socket address of the packet to mappings of previous translations that are stored in a memory 134 of the hardware accelerator. If an outgoing packet is not matched to a known connection, then the packet is part of a new connection and the packet is passed to the kernel 124. The kernel 124 can operate on a processor of the NAT device 100. The processor, and more particularly the kernel, can include the conntrack module 120. The kernel 120 can create a mapping between Device A's port 116 and the first public port 108 of the NAT device 100, and store this mapping as a conntrack entry in the conntrack entries 132. The kernel 124 can then use this mapping to perform translation on the packet's header (e.g., changing the source socket from that of Device A to that of the NAT device 100, and in particular port 108). The packet can then be transmitted to device B but will appear to have come from the NAT device's 100 public IP address and public port number for port 108.

However, the existing netfilter framework does not have a mechanism to perform Full Cone NAT and ARC NAT. To perform these functions, an open source NATTYPE module 126 can be used as a further component of the netfilter framework. The NATTYPE module 126 can be a part of the kernel 124 and can operate on the processor of the NAT device 100. The NATTYPE module 126 can create NATTYPE entries 128 when an outgoing packet of a new connection is first seen. In other words, a mapping of the translation of the outgoing packet can be stored as a NATTYPE entry. Where hardware acceleration is used, this mapping can further be stored as a NAT mapping in the hardware accelerator memory 134 so that the hardware accelerator 122 can compare subsequent packets to the mappings in its memory and thereby identify packets belonging to known connections.

However, use of the NATTYPE module 126 in combination with offloading of NAT processes to the hardware accelerator 122 can cause NATTYPE entries 128 in the NATTYPE module 126 to timeout. When hardware acceleration is used a hardware accelerator controller 130 monitors packets processed by the hardware accelerator 122. When a packet belonging to a known connection, where some socket of a NAT mapping in the hardware accelerator memory 134 matches a packet that reaches the hardware accelerator 122, the hardware accelerator controller 130 refreshes a corresponding conntrack entry in the kernel 124. However, there is no mechanism to also update NATTYPE entries 128 that correspond to the same known connection. Thus, these NATTYPE entries 128 eventually timeout and subsequent incoming packets on the connection are dropped since the NATTYPE module 126 does not have a record of any such connections having been established.

To resolve this situation, the NATTYPE module 126 can be modified such that a NATTYPE target of the NATTYPE module 126 both creates NATTYPE entries 128 (default functionality) and also creates an internal kernel mapping between corresponding conntrack entries 132 and NATTYPE entries 128 (new functionality). These internal kernel mappings can be stored in the conntrack entries 132. This solution further involves modification of the conntrack module 120 such that when the hardware accelerator controller 130 refreshes a conntrack entry, the conntrack module 120 checks the conntrack entry to see if an internal kernel mapping is stored there. If there is one, then the conntrack module 120 refreshes the corresponding NATTYPE entry referenced in the internal kernel mapping and thus prevents premature timeout of the NATTYPE entry.

In an embodiment, each NATTYPE entry can also be associated with a cookie when each NATTYPE entry is created. Then, when the conntrack module attempts to update a NATTYPE entry timeout, the conntrack module checks to see that a cookie is associated with the NATTYPE entry, and if so the update is performed. If not, then the request for the update is ignored. In an embodiment, network A and network B can be one and the same.

Figure 2:
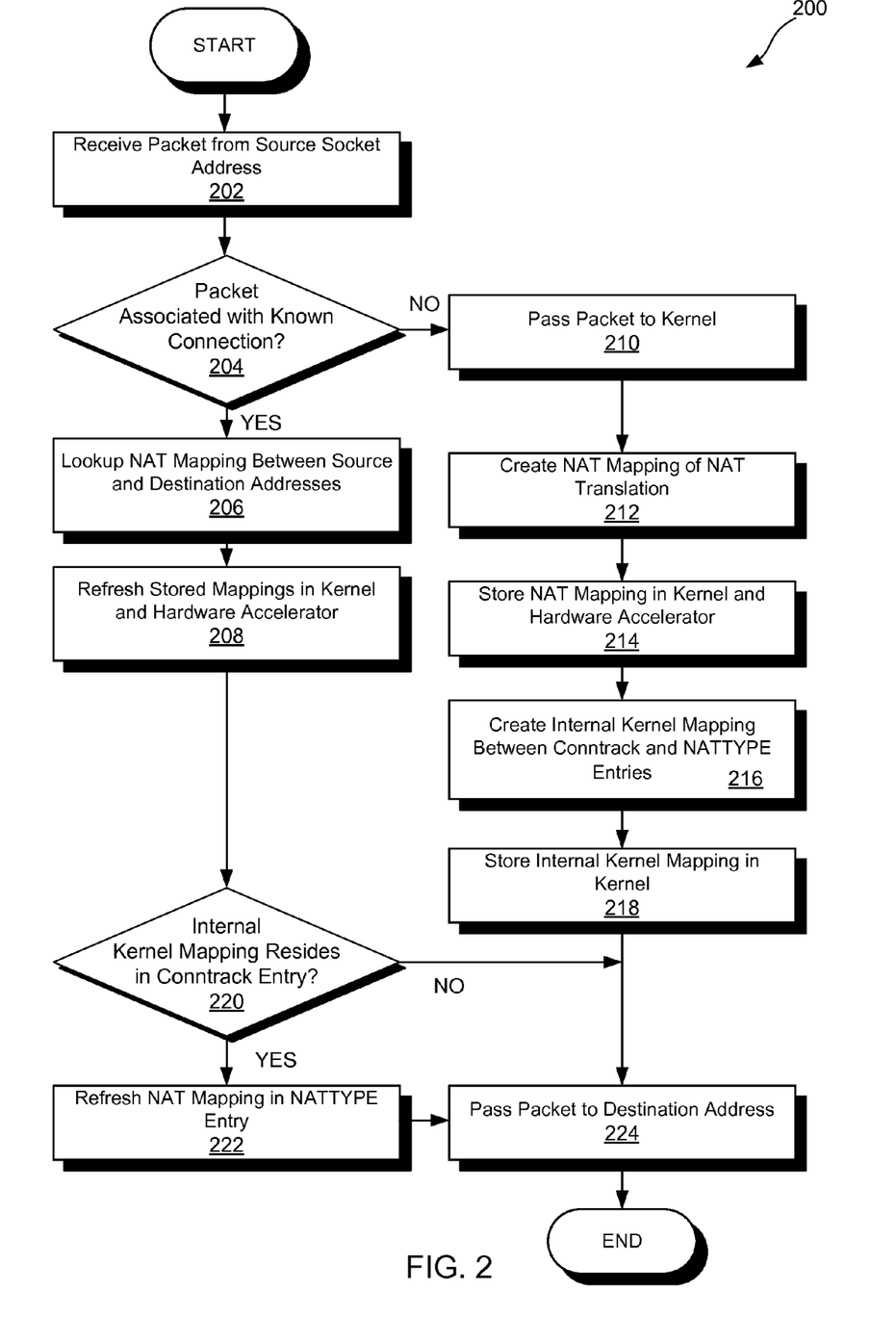
FIG. 2 illustrates a method of operating the system of FIG. 1.

FIG. 2 illustrates a method of operating the system of FIG. 1. The method 200 can prevent unintended or premature packet filtering in Full Cone NAT and ARC NAT when hardware acceleration is used. The method 200 can include receiving a packet from a source socket address (e.g., socket address of device A in FIG. 1). The packet can be received at a hardware accelerator (e.g., 122) (Block 202). A decision 204 can then determine if the packet is associated with a known connection. For instance, a hardware accelerator can compare the packet socket addresses to NAT mappings of NAT translations stored in a memory of the hardware accelerator. If no match is found, then the packet can be passed to a kernel of the NAT device (Block 210) for creation of a conntrack entry and translation of the packet's source socket address. A NAT mapping of this translation can be created (Block 212) and stored in the kernel (as a conntrack and NATTYPE entry) (Block 214) and in the hardware accelerator (Block 214). For instance, the NAT mapping can be stored in a conntrack entry (e.g., 132) of the conntrack module (e.g., 120), which has reserved memory in the kernel. The NAT mapping can also be stored in a NATTYPE entry (e.g., 128) of a NATTYPE module (e.g., 126), which has reserved memory in the kernel. The NAT mapping can further be stored in a memory of the hardware accelerator.

The method 200 further can create, via the kernel, an "internal kernel mapping" between the conntrack entry and the NATTYPE entry (Block 216). The internal kernel mapping can then be stored in the kernel (Block 218), and in particular in a corresponding conntrack entry. In an embodiment, the internal kernel mapping can be created by a modified NATTYPE target and in particular by a modified forward_out mode and dnat mode of the NATTYPE target.

Going back to the decision 204, if a received packet can be associated with a known connection, then a mapping between the source and destination addresses can be looked up (Block 206) in the hardware accelerator memory and the stored mappings in the kernel and the hardware accelerator can be refreshed (Block 208). This refresh can be performed via a hardware accelerator controller (e.g., 130). The method 200 can also determine if an internal kernel mapping, associated with the instant packet, resides in the conntrack entry (Decision 220). If so, then the conntrack module can also refresh the NAT mapping stored in the NATTYPE entry (Block 222).

After the internal kernel mapping is stored (for new connections, and see Block 218) or after the NATTYPE mapping is refreshed (for known connections, and see Block 222), the packet can be passed to its destination socket address (Block 224), where the packet has a source socket address corresponding to a public IP address and public port of the NAT device that performed the translating.

Figure 3:
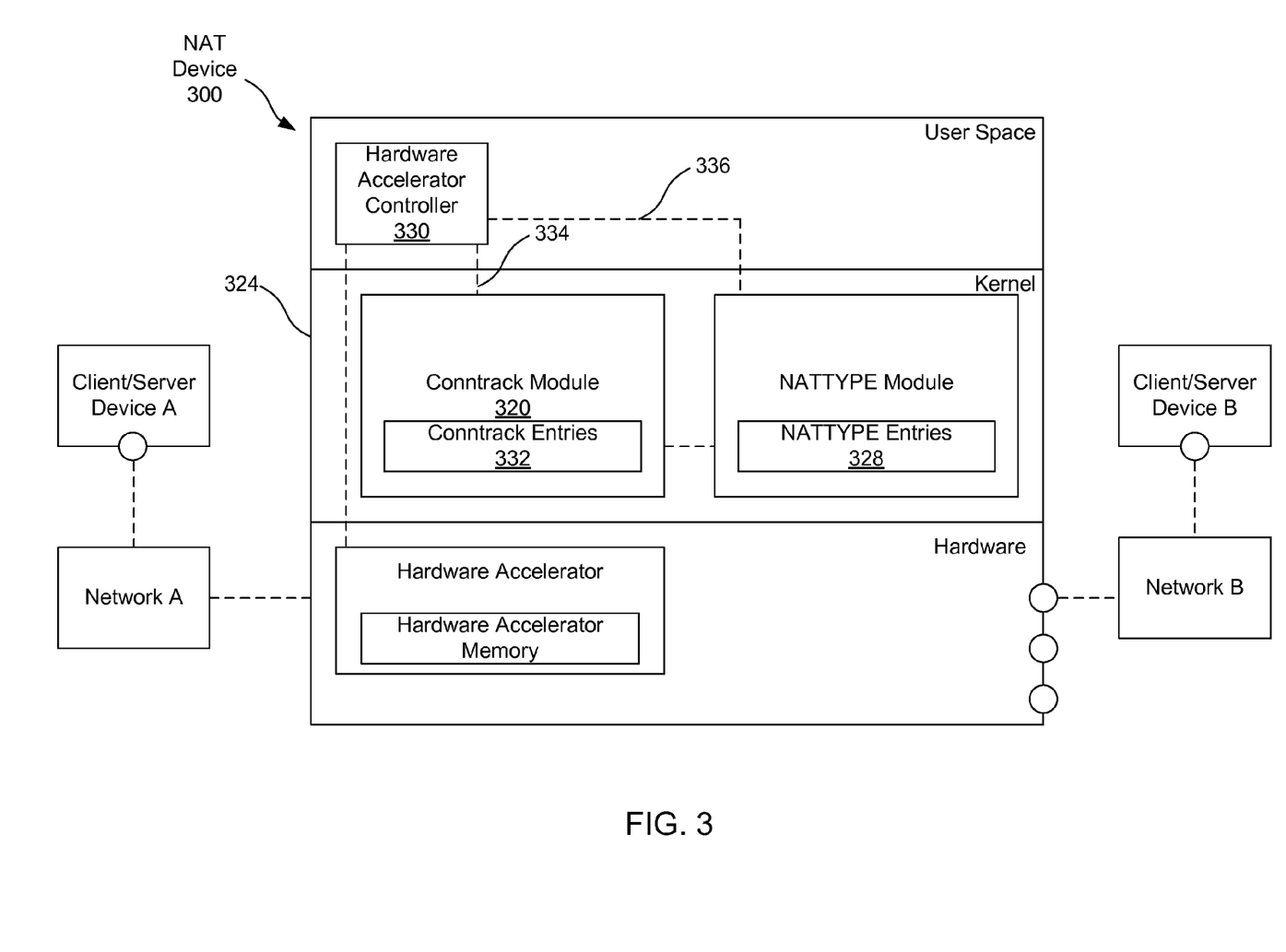
FIG. 3 illustrates a system for carrying out the NAT described herein.

FIG. 3 illustrates an alternative system for carrying out the NAT described herein. The NAT device 300 operates in a similar fashion to that described with reference to FIG. 1. However, here instead of a mapping between conntrack entries 332 and NATTYPE entries 328 being created, a hardware accelerator controller 330 updates the conntrack entries 332 and the NATTYPE entries 328 via two different netlink signals 334, 336.

Figure 4:
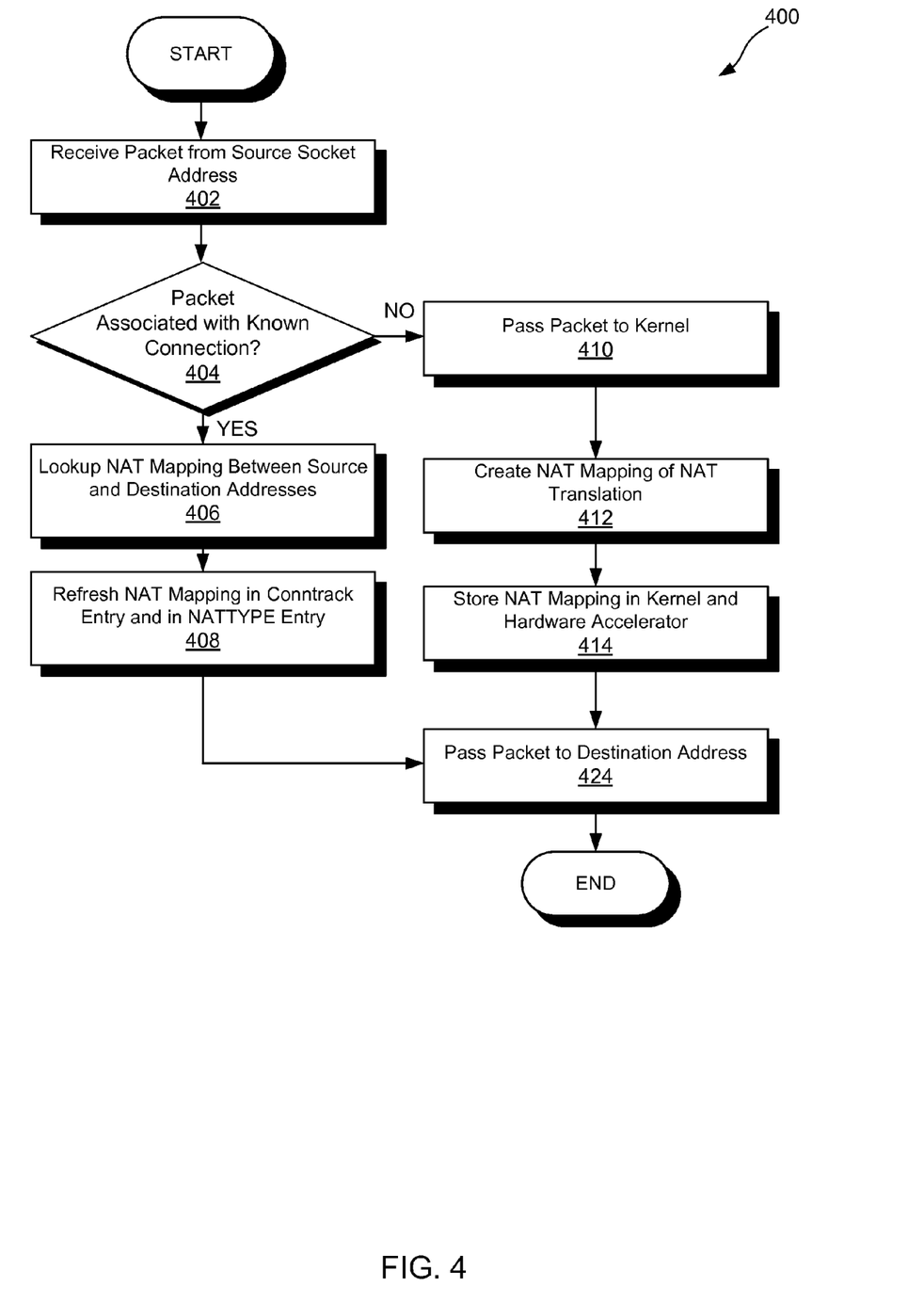
FIG. 4 illustrates a method of operating the system of FIG. 3.

FIG. 4 illustrates a method of operating the system of FIG. 3. The method 300 involves receiving a packet from a source socket address (Block 402). If the packet is not associated with a known connection (Decision 404), then the packet is passed to the kernel (Block 410). The kernel can then create a NAT mapping of the NAT translation to be performed on the packet's header (Block 412). The NAT mapping can then be stored in the kernel and the hardware accelerator (Block 414).

If the packet is associated with a known connection (Decision 404), then the hardware accelerator can lookup the NAT mapping for the connection as stored in the hardware accelerator memory (Block 406). A hardware accelerator controller can then refresh conntrack entries in the kernel and NATTYPE entries in the kernel (Block 408) via different netlink signals.

Once the NAT mapping has been stored, in the case of an unknown connection (Block 414), and once the conntrack and NATTYPE entries have been refreshed, in the case of a known connection (Block 408), the packet can be passed to a destination scoket address of the packet (Block 424).

While this invention has been described in the context of iptables, one of skill in the art will recognize that the disclosure is also applicable to Linux systems using other packet filter utilities, such as ipchains and ipfwadm.

Figure 5:
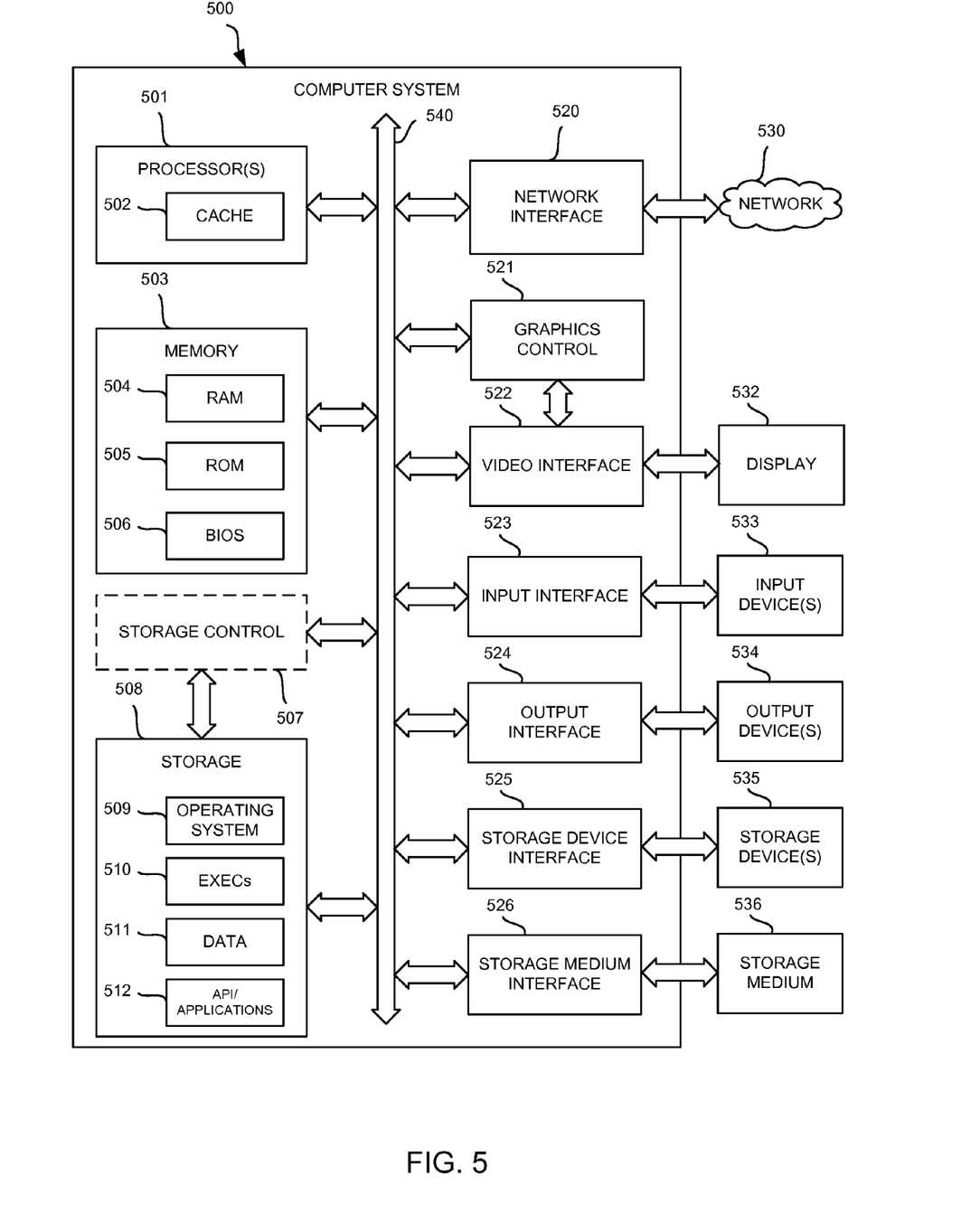
FIG. 5 shows a diagrammatic representation of one embodiment of a computer system 500.

The systems and methods described herein can be implemented in a computer system in addition to the specific physical devices described herein. FIG. 5 shows a diagrammatic representation of one embodiment of a computer system 500 within which a set of instructions can execute for causing a device to perform or execute any one or more of the aspects and/or methodologies of the present disclosure. NAT device 100 in FIG. 1 is one implementation of the computer system 500. The components in FIG. 5 are examples only and do not limit the scope of use or functionality of any hardware, software, firmware, embedded logic component, or a combination of two or more such components implementing particular embodiments of this disclosure. Some or all of the illustrated components can be part of the computer system 500. For instance, the computer system 500 can be a general purpose computer (e.g., a laptop computer) or an embedded logic device (e.g., an FPGA), to name just two non-limiting examples.

Computer system 500 includes at least a processor 501 such as a central processing unit (CPU) or an FPGA to name two non-limiting examples. The hardware accelerator 122 in FIG. 1 is one implementation of the processor 501. The computer system 500 may also comprise a memory 503 and a storage 508, both communicating with each other, and with other components, via a bus 540. The bus 540 may also link a display 532, one or more input devices 533 (which may, for example, include a keypad, a keyboard, a mouse, a stylus, etc.), one or more output devices 534, one or more storage devices 535, and various non-transitory, tangible computer-readable storage media 536 with each other and with one or more of the processor 501, the memory 503, and the storage 508. All of these elements may interface directly or via one or more interfaces or adaptors to the bus 540. For instance, the various non-transitory, tangible computer-readable storage media 536 can interface with the bus 540 via storage medium interface 526. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 501 (or central processing unit(s) (CPU(s))) optionally contains a cache memory unit 502 for temporary local storage of instructions, data, or computer addresses. Processor(s) 501 are configured to assist in execution of computer-readable instructions stored on at least one non-transitory, tangible computer-readable storage medium. Computer system 500 may provide functionality as a result of the processor(s) 501 executing software embodied in one or more non-transitory, tangible computer-readable storage media, such as memory 503, storage 508, storage devices 535, and/or storage medium 536 (e.g., read only memory (ROM)). For instance, the method 200 in FIG. 2 may be embodied in one or more non-transitory, tangible computer-readable storage media. The non-transitory, tangible computer-readable storage media may store software that implements particular embodiments, such as the methods 200 and 400, and processor(s) 501 may execute the software. Memory 503 may read the software from one or more other non-transitory, tangible computer-readable storage media (such as mass storage device(s) 535, 536) or from one or more other sources through a suitable interface, such as network interface 520. The first external network interface 108 is one embodiment of the network interface 520. The software may cause processor(s) 501 to carry out one or more processes or one or more steps of one or more processes described or illustrated herein. Carrying out such processes or steps may include defining data structures stored in memory 503 and modifying the data structures as directed by the software. In some embodiments, an FPGA can store instructions for carrying out functionality as described in this disclosure (e.g., the methods 200 and 400). In other embodiments, firmware includes instructions for carrying out functionality as described in this disclosure (e.g., the methods 200 and 400).

The memory 503 may include various components (e.g., non-transitory, tangible computer-readable storage media) including, but not limited to, a random access memory component (e.g., RAM 504) (e.g., a static RAM "SRAM", a dynamic RAM "DRAM, etc.), a read-only component (e.g., ROM 505), and any combinations thereof. ROM 505 may act to communicate data and instructions unidirectionally to processor(s) 501, and RAM 504 may act to communicate data and instructions bidirectionally with processor(s) 501. ROM 505 and RAM 504 may include any suitable non-transitory, tangible computer-readable storage media described below. In some instances, ROM 505 and RAM 504 include non-transitory, tangible computer-readable storage media for carrying out the methods 200 and 400. In one example, a basic input/output system 506 (BIOS), including basic routines that help to transfer information between elements within computer system 500, such as during start-up, may be stored in the memory 503.

Fixed storage 508 is connected bidirectionally to processor(s) 501, optionally through storage control unit 507. Fixed storage 508 provides additional data storage capacity and may also include any suitable non-transitory, tangible computer-readable media described herein. Storage 508 may be used to store operating system 509, EXECs 510 (executables), data 511, API applications 512 (application programs), and the like. For instance, the storage 508 could be implemented for storage of conntrack entries and NATTYPE entries as described relative to FIG. 1. Often, although not always, storage 508 is a secondary storage medium (such as a hard disk) that is slower than primary storage (e.g., memory 503). Storage 508 can also include an optical disk drive, a solid-state memory device (e.g., flash-based systems), or a combination of any of the above. Information in storage 508 may, in appropriate cases, be incorporated as virtual memory in memory 503.

In one example, storage device(s) 535 may be removably interfaced with computer system 500 (e.g., via an external port connector (not shown)) via a storage device interface 525. Particularly, storage device(s) 535 and an associated machine-readable medium may provide nonvolatile and/or volatile storage of machine-readable instructions, data structures, program modules, and/or other data for the computer system 500. In one example, software may reside, completely or partially, within a machine-readable medium on storage device(s) 535. In another example, software may reside, completely or partially, within processor(s) 501.

Bus 540 connects a wide variety of subsystems. Herein, reference to a bus may encompass one or more digital signal lines serving a common function, where appropriate. Bus 540 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 500 may also include an input device 533. In one example, a user of computer system 500 may enter commands and/or other information into computer system 500 via input device(s) 533. Examples of an input device(s) 533 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 533 may be interfaced to bus 540 via any of a variety of input interfaces 523 (e.g., input interface 523) including, but not limited to, serial, parallel, game port, USB, FIREWIRE, THUNDERBOLT, or any combination of the above.

In particular embodiments, when computer system 500 is connected to network 530 (such as networks A and B in FIGS. 1 and 3), computer system 500 may communicate with other devices, such as mobile devices and enterprise systems, connected to network 530. Communications to and from computer system 500 may be sent through network interface 520. For example, network interface 520 may receive incoming communications (such as requests or responses from other devices) in the form of one or more packets (such as Internet Protocol (IP) packets) from network 530, and computer system 500 may store the incoming communications in memory 503 for processing. Computer system 500 may similarly store outgoing communications (such as requests or responses to other devices) in the form of one or more packets in memory 503 and communicated to network 530 from network interface 520. Processor(s) 501 may access these communication packets stored in memory 503 for processing.

Examples of the network interface 520 include, but are not limited to, a network interface card, a modem, and any combination thereof. Examples of a network 530 or network segment 530 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. For instance, networks A and B are exemplary implementations of the network 530. A network, such as network 530, may employ a wired and/or a wireless mode of communication. In general, any network topology may be used.

Information and data can be displayed through a display 532. Examples of a display 532 include, but are not limited to, a liquid crystal display (LCD), an organic liquid crystal display (OLED), a cathode ray tube (CRT), a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521.

In addition to a display 532, computer system 500 may include one or more other peripheral output devices 534 including, but not limited to, an audio speaker, a printer, and any combinations thereof. Such peripheral output devices may be connected to the bus 540 via an output interface 524. Examples of an output interface 524 include, but are not limited to, a serial port, a parallel connection, a USB port, a FIREWIRE port, a THUNDERBOLT port, and any combinations thereof.

In addition or as an alternative, computer system 500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Within this specification, the same reference characters are used to refer to terminals, signal lines, wires, etc. and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, or microcontroller. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., the methods 200 and 400) may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A NAT device comprising:
   an external network interface having a public IP address and a public port number;
   a hardware accelerator comprising a first non-transitory, tangible computer readable storage medium, encoded with processor readable instructions to perform a first method, the method comprising:
   determining that a first packet is being transmitted on an unknown connection; and passing the first packet to a kernel of the NAT device; and a processor comprising:
   the kernel;
   a conntrack module;
   a NATTYPE module; and
   a second non-transitory, tangible computer readable storage medium, encoded with processor readable instructions to perform a second method for creating conntrack entries and NATTYPE entries in a kernel memory of the processor, the second method comprising:
      replacing the first packet's source IP address and source port number with the public IP address and public port number of the external network interface;
      storing a first mapping as part of a conntrack entry in the conntrack module, the first mapping comprising a mapping of the first packet's source IP address and source port number with the public IP address and public port number of the external network;
      storing the first mapping as part of a NATTYPE entry in the NATTYPE module;
      storing the first mapping in a memory of the hardware accelerator;
      storing a second mapping between the conntrack entry and the NATTYPE entry in the conntrack entry; and
      transmitting the first packet to a destination IP address and a destination port.

2. The NAT device of claim 1, further comprising a hardware accelerator controller comprising a non-transitory, tangible computer readable medium, encoded with processor readable instructions to perform a third method for refreshing timeout values of the conntrack entry and the NATTYPE entry, the third method comprising:
   monitoring incoming and outgoing packets passing through the hardware accelerator, and when one of these packets is received at the public IP address and public port number, then;
   refreshing the conntrack entry based on the one of these packets;
   checking to see if the conntrack entry includes a mapping between the conntrack entry and the NATTYPE entry, and if so, then;
   refreshing the NATTYPE entry.

3. The NAT device of claim 2, wherein:
   the second method of the non-transitory, tangible computer readable storage medium of the hardware accelerator further comprises creating a cookie associated with each of the NATTYPE entries; and
   the third method of the non-transitory, tangible computer readable storage medium of the hardware accelerator controller further comprises checking to see if a cookie is associated with the NATTYPE entry before performing the refreshing.

4. The NAT device of claim 1, further comprising a hardware accelerator controller comprising a non-transitory, tangible computer readable medium, ecnodeed with processor readable instructions to perform a third method for refreshing timeout values of the conntrack entry and the NATTYPE entry, the third method comprising:
   monitoring incoming and outgoing packets passing through the hardware accelerator, and when one of these packets is received at the public IP address and public port number, and has a source IP address and source port matching the destination IP address and the destination port of the first packet, then;
   refreshing the conntrack entry based on the one of these packets;
   checking to see if the conntrack entry includes a mapping between the conntrack entry and the NATTYPE entry, and if so, then;
   refreshing the NATTYPE entry.

5. The NAT device of claim 1, further comprising a hardware accelerator controller comprising a non-transitory, tangible computer readable medium, ecnodeed with processor readable instructions to perform a third method for refreshing timeout values of the conntrack entry and the NATTYPE entry, the third method comprising:
   monitoring incoming and outgoing packets passing through the hardware accelerator, and when one of these packets is received from a source IP address and source port matching those of the first packet, then;
   refreshing the conntrack entry based on the one of these packets;
   checking to see if the conntrack entry includes a mapping between the conntrack entry and the NATTYPE entry, and if so, then;
   refreshing the NATTYPE entry.

6. The NAT device of claim 1, wherein the hardware accelerator determines that the first packet is not part of a known connection by comparing the first packet to the first mapping stored in the memory of the hardware accelerator.

7. A method for preventing unintended packet filtering in Full Cone NAT and Address Restricted Cone NAT using hardware acceleration, the method comprising:
   receiving, from a device behind a NAT, a first packet at a hardware accelerator of the NAT performing Full Cone NAT or Address Restricted Cone NAT, the first packet destined for a device external to the NAT;
   determining, via the hardware accelerator, that the first packet is not associated with a known connection;
   passing the first packet from the hardware accelerator to a kernel of the NAT;
   creating a NAT mapping of a translation of the first packet's source socket address from a private to a public socket address;
   translating, via the kernel, the first packet's source socket address from the private to the public socket address based on the NAT mapping;
   storing the NAT mapping in a conntrack entry of kernel memory;
   storing the NAT mapping in a NATTYPE entry of the kernel memory;
   storing the NAT mapping in a memory of the hardware accelerator;
   creating, via the kernel, an internal kernel mapping between the conntrack entry and the NATTYPE entry; and
   storing the internal kernel mapping in the conntrack entry of the kernel memory.

8. The method of claim 7, wherein a NATTYPE target of the kernel, creates the internal kernel mapping between the conntrack entry and the NATTYPE entry.

9. The method of claim 8, wherein a forward_out mode of the NATTYPE target of the kernel, creates the internal kernel mapping between the conntrack entry and the NATTYPE entry.

10. The method of claim 7, further comprising:
   receiving, from the device external to the NAT, a second packet at the hardware accelerator of the NAT, the second packet destined for the device behind the NAT;

determining, via the hardware accelerator, that the second packet is associated with a known connection between the device behind the NAT and the device external to the NAT;

translating, via the hardware accelerator, a destination socket address of the second packet;

passing the second packet to the device behind the NAT using a destination socket address obtained from the NAT mapping in the memory of the hardware accelerator;

refreshing, via a hardware accelerator controller, the NAT mapping in the conntrack entry of the kernel memory;

determining, via the hardware accelerator controller, that the internal kernel mapping between the conntrack entry and the NATTYPE entry exists; and refreshing, via a conntrack module of the kernel, the NAT mapping in the NATTYPE entry of the kernel memory.

11. The method of claim 7, wherein a NATTYPE target creates the internal kernel mapping between the conntrack entry and the NATTYPE entry.

12. The method of claim 11, wherein a forward_out mode of the NATTYPE target creates the internal kernel mapping between the conntrack entry and the NATTYPE entry.

13. A non-transitory, tangible computer readable storage medium, encoded with processor readable instructions to perform a method for preventing unintended packet filtering in Full Cone NAT and Address Restricted Cone NAT using hardware acceleration, the method comprising:

receiving, from a device behind a NAT, a first packet at a hardware accelerator of the NAT performing Full Cone NAT or Address Restricted Cone NAT, the first packet destined for a device external to the NAT;

determining that the first packet is not associated with a known connection;

passing the first packet from the hardware accelerator to a kernel of the NAT;

creating a NAT mapping of a translation of the first packet's source socket address from a private to a public socket address;

translating, via the kernel, the first packet's source socket address from the private to the public socket address based on the NAT mapping;

storing the NAT mapping in a conntrack entry of kernel memory;

storing the NAT mapping in a NATTYPE entry of the kernel memory;

storing the NAT mapping in a memory of the hardware accelerator;

creating, via the kernel, an internal kernel mapping between the conntrack entry and the NATTYPE entry; and storing the internal kernel mapping in the conntrack entry of the kernel memory.

14. The non-transitory, tangible computer readable storage medium of claim 13, wherein a NATTYPE target of the kernel, creates the internal kernel mapping between the conntrack entry and the NATTYPE entry.

15. The non-transitory, tangible computer readable storage medium of claim 14, wherein a forward_out mode of the NATTYPE target of the kernel, creates the internal kernel mapping between the conntrack entry and the NATTYPE entry.

16. The non-transitory, tangible computer readable storage medium of claim 15, further comprising:

receiving, from the server device, a second packet at the hardware accelerator of the NAT device, the second packet destined for the client device;

determining, via the hardware accelerator, that the second packet is associated with a known connection between the client device and the server device;

translating, via the hardware accelerator, a destination socket address of the second packet;

passing the second packet to the client device using a destination socket address obtained from the NAT mapping in the memory of the hardware accelerator;

refreshing, via a hardware accelerator controller, the NAT mapping in the conntrack entry of the kernel memory;

determining, via the hardware accelerator controller, that the internal kernel mapping between the conntrack entry and the NATTYPE entry exists; and refreshing, via a conntrack module of the kernel, the NAT mapping in the NATTYPE entry of the kernel memory.

17. The non-transitory, tangible computer readable storage medium of claim 13, wherein a NATTYPE target creates the internal kernel mapping between the conntrack entry and the NATTYPE entry.

18. The non-transitory, tangible computer readable storage medium of claim 17, wherein a forward_out mode of the NATTYPE target creates the internal kernel mapping between the conntrack entry and the NATTYPE entry.

* * * * *